United States Patent [19]

Debus, Jr. et al.

[11] Patent Number: 4,759,037
[45] Date of Patent: Jul. 19, 1988

[54] PASSBAND EQUALIZATION OF MODULATED QUADRATURE-RELATED CARRIER SIGNALS

[75] Inventors: Walter Debus, Jr., Nottingham; Peter D. Karabinis, Atkinson, both of N.H.

[73] Assignees: American Telephone and Telegraph Company, New York, N.Y.; Bell Telephone Laboratories, Incorporated, Murray Hill, N.J.

[21] Appl. No.: 856,397

[22] Filed: Apr. 28, 1986

[51] Int. Cl.⁴ ............................................. H03H 7/30
[52] U.S. Cl. ....................................... 375/15; 333/18
[58] Field of Search ..................................... 375/12–15, 375/102, 16; 333/18

[56] References Cited

U.S. PATENT DOCUMENTS

| | | | |
|---|---|---|---|
| 3,755,738 | 8/1973 | Gitlin et al. | |
| 4,004,226 | 1/1977 | Qureshi et al. | 375/15 |
| 4,247,940 | 1/1981 | Mueller et al. | 375/14 |
| 4,384,355 | 5/1983 | Werner | 333/18 |
| 4,475,211 | 10/1984 | Mattis, Jr. et al. | 375/15 |
| 4,607,377 | 8/1986 | Atobe et al. | 333/18 |

Primary Examiner—Robert L. Griffin
Assistant Examiner—Marianne Huseman
Attorney, Agent, or Firm—David R. Padnes

[57] ABSTRACT

A technique is disclosed for equalizing an incoming signal including quadrature-related carrier signals by forming the product of the incoming signal at at least one prescribed time and only one real-valued coefficient associated with each time. In one embodiment of the present invention, the equalized incoming signal is demodulated into a first pair of component signals. At least one of these component signals is then used to generate each coefficient. In another embodiment of the present invention, each coefficient is generated in response to at least one of the component signals in the first pair along with a second pair of component signals which are formed by demodulating the incoming signal. This technique can be advantageously adapted to incorporate a number of coefficient updating algorithms and is suitable for use in a number of modulation formats.

24 Claims, 5 Drawing Sheets

PASSBAND EQUALIZATION OF MODULATED QUADRATURE-RELATED CARRIER SIGNALS

TECHNICAL FIELD

This invention relates to passband equalizers for providing distortion compensation in modulated quadrature-related carrier signals and, in particular, to a passband equalizer having a single set of real-valued coefficients.

BACKGROUND OF THE INVENTION

The process of correcting distortion in an information-bearing signal is called equalization. This process may be performed on an information-bearing signal at passband or at baseband. The expression "passband" refers to the information-bearing signal prior to demodulation and the term "baseband" refers to the information-bearing signal after demodulation.

The typical equalizer structure is a time domain network wherein the product of a coefficient and the information signal at at least one predetermined time is formed to generate the equalizer output signal. In general, for this structure, the greater the number of coefficients, the more precise the distortion compensation. In addition, since the distortion in the transmission channel is time-varying, the coefficients must be adjusted so that the compensation provided varies with the distortion. A number of techniques having varying degrees of accuracy, such as zero forcing and least mean square, can be utilized to provide coefficient adjustment.

When the information-bearing signal takes the form of modulated quadrature-related carrier signals, four sets of coefficients are required for equalization at baseband. Each coefficient set includes one or more coefficients depending on the precision desired. Accordingly, four products at each predetermined time must be formed to produce the equalized baseband signals. Equalization of modulated quadrature-related carrier signals can be performed at passband using a technique disclosed in U.S. Pat. No. 3,755,738, issued Apr. 28, 1973 to R. D. Gitlin et al. This disclosed technique requires only two sets of coefficients. This requirement is also true of a refinement in the Gitlin et al approach disclosed in U.S. Pat. No. 4,247,940, issued Jan. 27, 1981 to K. H. Mueller et al. While both of these passband equalization techniques perform satisfactorily, their implementation is still rather complex as two products must be formed at each predetermined time and then combined into the equalizer output signal. As a result, the required circuitry can, at times, exceed system cost objects.

SUMMARY OF THE INVENTION

The present invention is concerned with reducing the circuitry necessary to equalize an incoming signal including modulated quadrature-related carrier signals. In accordance with the present invention, equalization is accomplished by forming the product of the incoming signal at at least one prescribed time and only one real-valued coefficient associated with each time. This reduction in the number of coefficient sets required and, hence, the necessary equalizer structure, is achieved, pursuant to one embodiment of the present invention, by generating each coefficient in response to at least one signal in a pair of signals formed by demodulating the equalized incoming signal. In another embodiment of the present invention, each coefficient is generated in response to the previously described signal along with a second pair of signals formed by demodulating the incoming signal.

A feature of the present invention is that it can be adapted for use with a number of different coefficient updating algorithms and modulation formats.

DETAILED DESCRIPTION

Figure 1:
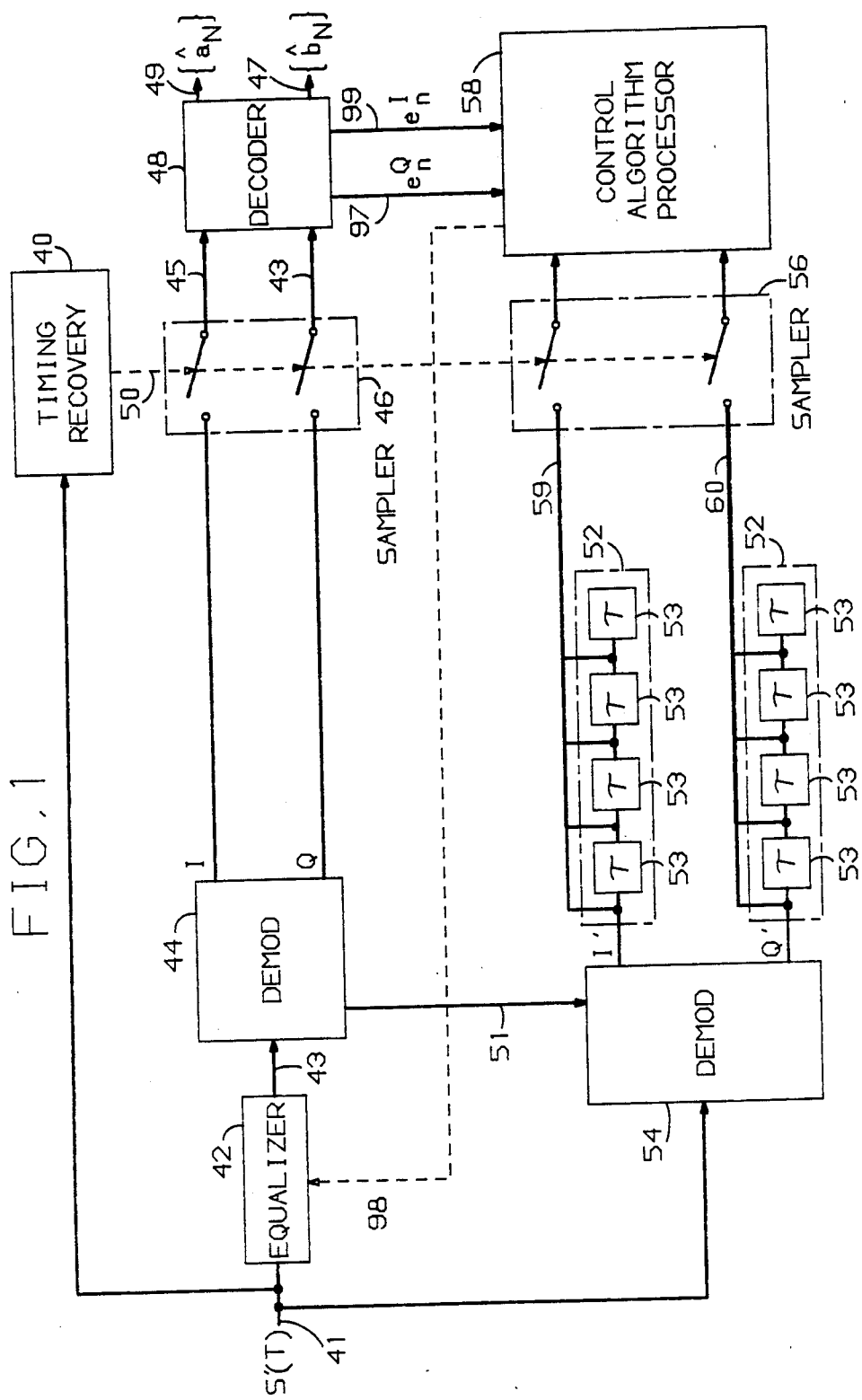
FIG. 1 is a block diagram of a receiver incorporating a first embodiment of present invention.

Referring to FIG. 1, lead 41 of a communications system receiver conducts an information-bearing signal S'(t) comprising modulated quadrature-related carrier signals and distortion to equalizer 42, demodulator 54, and timing recovery circuit 40. Such distortion was induced by prior signal processing at the transmitting or receiving end of the communications system and/or propagation through a communications channel.

Signal S'(t) is generated at the transmitting end (not shown) of the communications system by modulating the amplitudes of quadrature-related carrier signals with digital data signals. This form of modulation, wherein the information is carried at one of a plurality of discrete amplitude levels, is referred to by a variety of names, such as quadrature amplitude modulation (QAM), phase shift keying (PSK), and amplitude and phase shift keying (APSK). The information represented by the data signals is virtually limitless and can include voice, video, facsimile and the like. In addition, the transmission channel over which the modulated carrier signals propagate is also not limited and can presently include air, wire, or lightguide. In any event, regardless of the transmission channel utilized, signal S'(t) is at passband and the frequency of the carrier signals is at a predetermined radio frequency (RF) or at a predetermined intermediate frequency (IF). In the latter case, a conventional frequency translator or "down-converter" is used to shift the carrier frequency from RF to IF in certain systems applications.

Equalizer 42 compensates for the distortion in S'(t) by generating an equalized version of S'(t), designated as S(t). Demodulator 44 receives S(t) via lead 43. Within demodulator 44, the quadrature-related carrier signals are extracted from S(t) to form the in-phase (I) and quadrature (Q) component signals. This extraction process is well-known and utilizes a carrier recovery circuit within demodulator 44. Sampler 46, clocked by a timing signal on lead 50, samples the amplitudes of the I and Q component signals at the baud rate. The timing signal is generated on lead 50 by timing recovery circuit 40. The sampling times provided by this timing signal may be slightly offset in time relative to the time at which the quadrature-related carrier signals are modulated within the transmitter.

The sampled I and Q component signals are coupled via leads 45 and 43 to decoder 48. In decoder 48, each sampled I and Q signal amplitude is respectively quantized into the closest one of the plurality of amplitude levels on which information is carried. This plurality of amplitude levels is generally the same for each of the quadrature-related carrier signals. However, such amplitude levels for each carrier signal may be different.

The quantization of each sampled I or Q signal amplitude produces an estimate of the data signal value corresponding to each sampled amplitude. The sets of estimates for the $n^{th}$ sampling time, where n is any integer, are respectively designated as $\{\hat{a}_n\}$ and $\{\hat{b}_n\}$. These sets of estimates appear on leads 49 and 47 wherein they are coupled to other signal processing circuitry (not shown).

Decoder 48 also produces a set of error signals on leads 99 and 97 which are designated as $e_n^I$ and $e_n^Q$. Error signal $e_n^I$ is equal to the algebraic difference between the sampled I signal amplitude at the $n^{th}$ sampling time and $\hat{a}_n$. Similarly, error signal $e_n^Q$ is equal to the algebraic difference between the sampled Q signal amplitude at the $n^{th}$ sampling time and $\hat{b}_n$.

Signal S'(t) is also coupled to demodulator 54. Demodulator 54 extracts the in-phase and quadrature component signals, designated as I' and Q', from S'(t) using the quadrature-related carrier signals on lead 51 generated by the carrier recovery circuit within demodulator 44. These carrier signals are coupled to demodulator 54 via bus 51. Signals I' and Q' are each coupled through identical delay lines 52 comprising a number of delay elements 53. Each delay element provides a delay $\tau$. As will be discussed, delay line 52 is identical to the delay line in equalizer 42. Buses 59 and 60 couple signals I' and Q' and the delayed versions thereof appearing at the output of each delay element in parallel to sampler 56.

Sampler 56 simultaneously samples the amplitudes of I' and Q' signals on buses 59 and 60 at the baud rate and in synchronism with sampler 46 as both are controlled by the timing signal on lead 50. Control algorithm processor 58 generates each coefficient for equalizer 42 on bus 98. As will be discussed, processor 58 can generate each of these coefficients in response to I', Q' and either one of the error signals if the least mean square algorithm or a variant thereof is adopted. Alternatively, processor 58 can generate the coefficient in response to $\{\hat{a}_n\}$, $\{\hat{b}_n\}$ and either one of the error signals.

Figure 2:
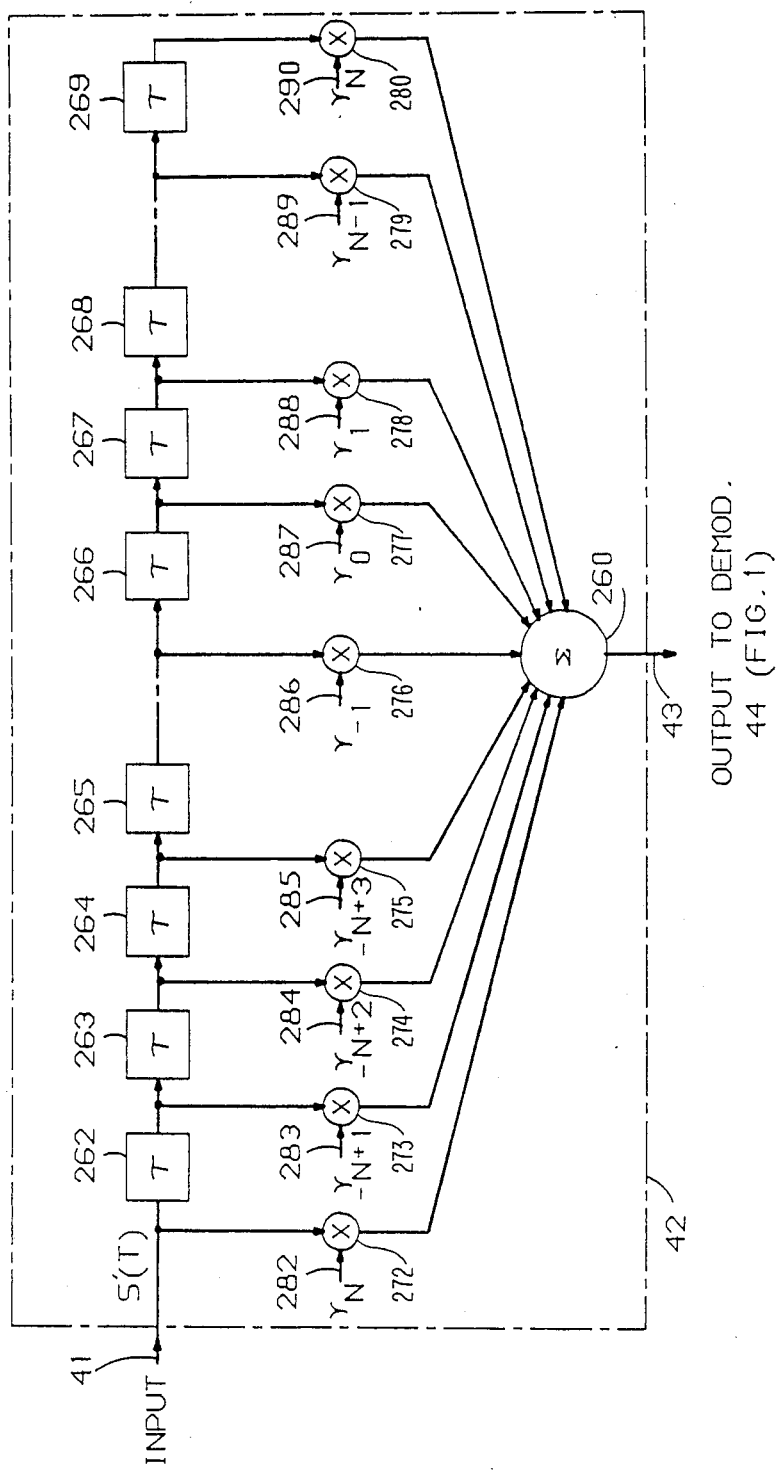
FIG. 2 is the passband equalizer 42 of FIG. 1.

Refer now to FIG. 2 which shows a schematic diagram of equalizer 42 in accordance with the present invention. Signal S'(t) on lead 41 is passed through a delay line comprising a series of delay elements 262 through 269. Each delay element provides a signal delay $\tau$. Signal S'(t) and its delayed versions appearing at the output of each delay element are respectively coupled to multipliers 272 through 280. Multipliers 272 through 280 respectively form the product of each coupled signal S'(t) and an associated coefficient. These coefficients, respectively designated as $\gamma_{-N}, \gamma_{-N+1} \ldots \gamma_N$ where 2N denotes the total number of delay line elements, are coupled from controller 58 on leads 282 through 290 in bus 98. Summer 260 adds all of the products formed by multipliers 272 through 280 to form S(t) on lead 43.

Figure 3:
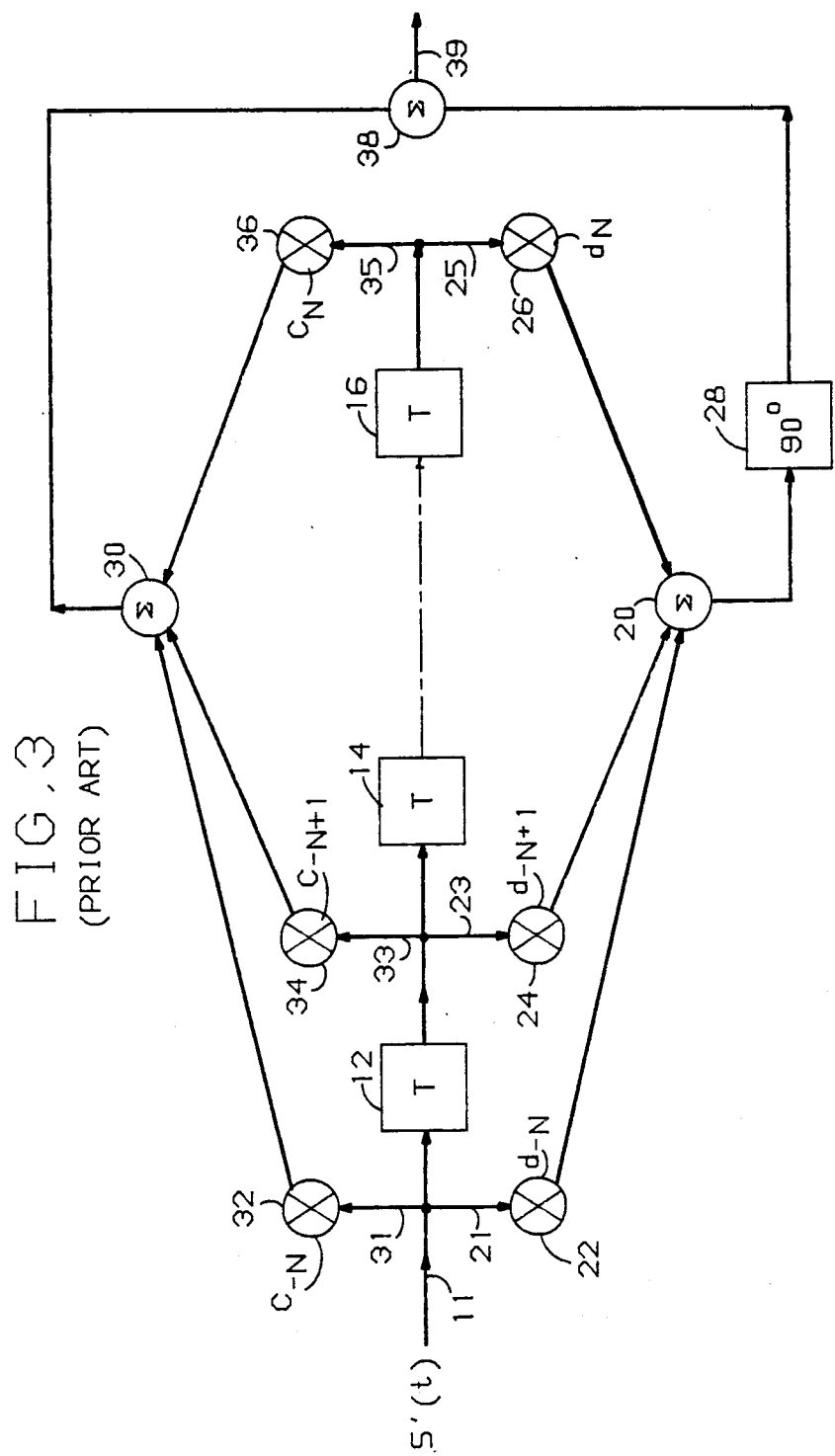
FIG. 3 is a prior art passband equalizer.

The structure of FIG. 2 for passband equalization of quadrature-related carrier signals provides a significant reduction in circuitry vis a vis the prior art. This is particularly true where a large number of coefficients is necessary for the desired distortion compensation precision. To appreciate this reduction, refer now to FIG. 3 which shows a prior art passband equalizer for equalizing quadrature-related carrier signals. As with the disclosed embodiment of the present invention, the prior art equalizer includes a delay line comprising delay elements 12, 14 ... 16 wherein each delay element provides a delay T. Delay T is either equal to the baud interval or a fraction thereof. The signal S'(t), comprising quadrature-related carrier signals, is coupled on lead 11 through the delay line and this signal and its delayed versions appearing at the output of each delay element are coupled to multipliers 32, 34 ... 36 to respectively form the product of each coupled signal and an associated coefficient $C_{-N}, C_{-N+1} \ldots C_N$. All of these products are then summed by summer 30. Now, in contrast to the present invention, S'(t) and its delayed versions appearing at the output of each delay element are also coupled to a second set of multipliers 22, 24 ... 26 to respectively form the product of their supplied signal and an associated one of the coefficients $D_{-N}, D_{-N+1} \ldots D_N$. The products formed using this second set of coefficients are added by summer 20, phase shifted by 90 degrees by phase-shifter 28 and then added to the output of summer 30 via summer 38 to form the equalized signal on lead 39.

Figure 4:
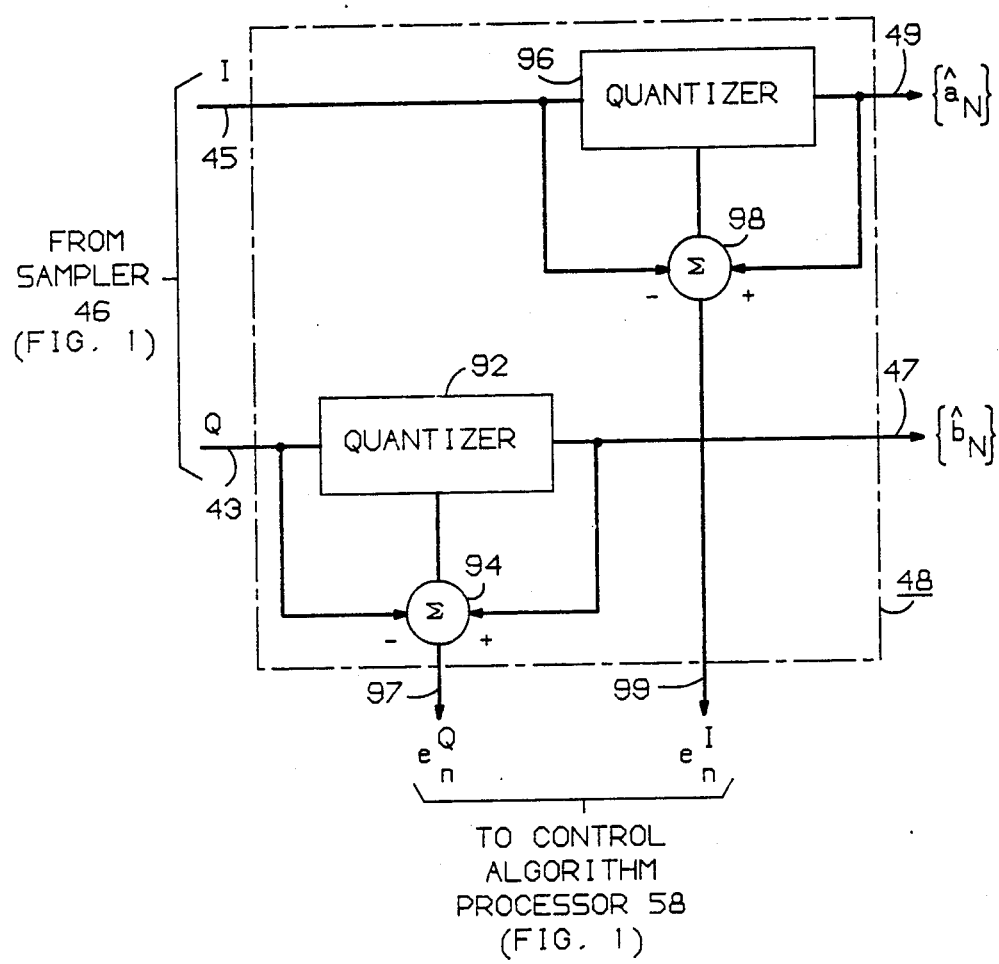
FIG. 4 is a block-schematic diagram of the decoder 48 of FIG. 1.

Refer now to FIG. 4 which shows decoder 48 of FIG. 1 receiving the sampled I and Q component signals of S(t) on leads 45 and 43. The I component signal passed through quantizer 96 where each sampled I component signal is assigned to the closest one of the plurality of amplitude levels on which information is carried on the I component signal. The set of assigned levels, designated as $\{\hat{a}_n\}$, appears on lead 49. Each sampled I component signal and the associated assigned level $\hat{a}_n$ are also coupled to summer 98. Summer 98 subtracts each sampled I component from the associated assigned level $\hat{a}_n$ to form error signal $e_n^I$ on lead 99. In similar fashion, each sampled Q component signal on lead 43 is coupled to quantizer 92 where it is assigned to the closest one of the plurality of amplitude levels on which information is carried for this component signal. The set of resulting assigned levels, designated as $\{\hat{b}_n\}$, appears on lead 47. In addition, summer 94 generates error signal $e_n^Q$ on lead 97 by subtracting each sampled Q component signal from its associated assigned value.

Controller 58 generates each coefficient in equalizer 42. Each of these coefficients can be expressed as a complex number $\overline{C}_i$ where i denotes any one coefficient and lies in the range $-N \leq i \leq N$. Denoting the complex conjugate of $\overline{C}_i$ as $\overline{C}_i^*$, we can express $\overline{C}_i^*$ at the $(K+1)$ sampling time as $$(\overline{C}_i^*)_{K+1} = (\overline{C}_i^*)_K + 2\mu(e_n^I - je_n^Q)(I_t' + jQ_t') \quad (1)$$

where
$(\overline{C}_i^*)_K$ is the complex conjugate of the $i^{the}$ coefficient at the $k^{th}$ coefficient upgrading time;
$I_t'$ and $Q_t'$ are the demodulated components of S'(t) each evaluated at $t = nT - \tau(N+i)$ where S'(t) is the signal appearing on lead 41 in FIG. 1;
T is the baud interval and nT refers to the $n^{th}$ sampling time;
$j = \sqrt{-1};$
$\mu$ = a predetermined constant which determines the smallest positive or negative coefficient increment; and
$e_n^I$ and $e_n^Q$ are the error signals at the $n^{th}$ sampling time corresponding to the $(K+1)^{th}$ coefficient update.

It should be noted that in equation (1) any coefficient update time coincides with a sampling time, i.e., $K = mn$, where m is an integer $\geq 1$. In the extreme, each coefficient can be updated in response to every input signal sample. However, where the distortion is slowly varying as compared to the baud rate, each coefficient can be updated after some integer number of input signal samples.

Since equation (1) is a complex-valued equation it can be decomposed into the following real-valued equations:

$$[A_i]_{K+1} = [A_i]_K + 2\mu[e_n^I I_t' + e_n^Q Q_t'] \quad (2)$$

and $$[B_i]_{K+1} = [B_i]_K + 2\mu[e_n^I Q_t' + e_n^Q I_t'] \quad (3)$$

where $A_i$ and $B_i$ respectively denote the real and imaginary parts of $\overline{C}_i^*$ at the $(K+1)^{th}$ and $K^{th}$ coefficient updating times.

Since it can be shown that $e_n^I D^{I'} = e_n^Q D Q'$, equations (2) and (3) can be respectively rewritten as:

$$[A_i]_{K+1} = [A_i]_K + 4\mu[e_n^I I_t'] \quad (4)$$

$$[B_i]_{K+1} = [B_i]_K - 4\mu[e_n^I Q_t'] \quad (5)$$

Consequently, using the equality $e_n^I I_t' = e_n^Q Q_t'$, both the real and imaginary parts of each equalizer coefficient can be incremented in response to $I_t'$, $Q_t'$, and either one of the error signals $e_n^I$ and $e_n^Q$. Furthermore, while the coefficient incrementation provided by equations (4) and (5) incorporate the least mean square algorithm, other algorithms can be used by modifying equations (4) and (5). For example, the hybrid least mean square algorithm can be incorporated by using only the algebraic sign of $e_n^I$ or $e_n^Q$ in lieu of the algebraic sign and magnitude of $e_n^I$ or $e_n^Q$. Or, by using only the algebraic sign $I_t'$ and $Q_t'$ in lieu of the algebraic sign and magnitude of these terms, the clipped least means square algorithm is adopted. Or, by using the algebraic signs of $I_t'$ and $Q_t'$ along with the algebraic sign of $e_n^I$ or $e_n^Q$, the modified zero forcing-least mean square algorithm is incorporated. Finally, by substituting the value or algebraic sign of $\hat{a}$ and at $t = nT - i\tau$ for $I_t'$ and $Q_t'$ and using the value or algebraic sign of $e_n^I$ or $e_n^Q$, the zero forcing algorithm and its variants can be followed.

Figure 5:
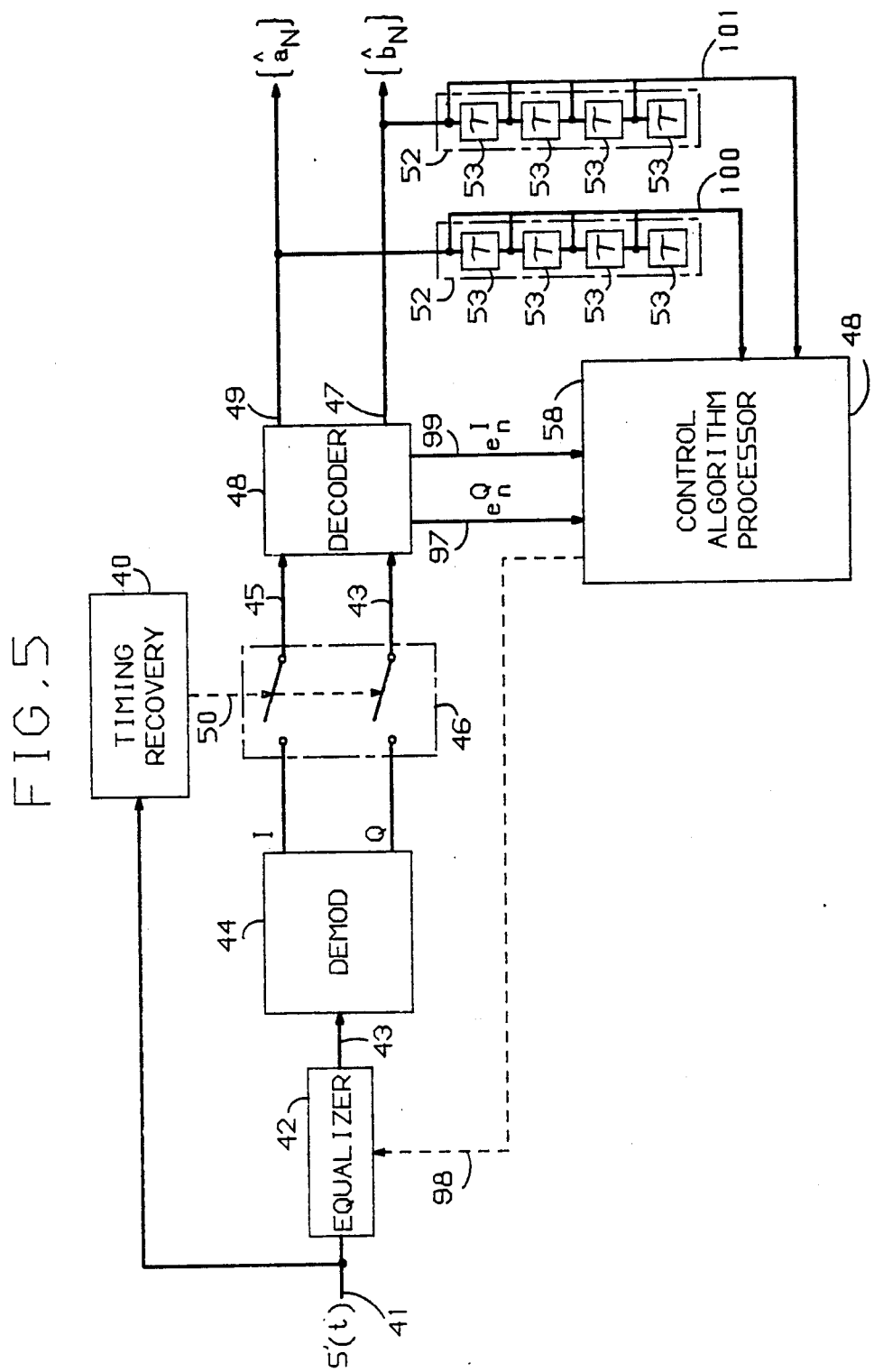
FIG. 5 is a block diagram of a receiver incorporating a second embodiment of the present invention.

A receiver structure incorporating the zero forcing algorithm or its variants is shown in FIG. 5. FIG. 5 is identical to FIG. 1 except for the deletion of demodulator 54 and sampler 56 and the transposition of delay lines 52 between the output of decoder 48 and processor 58. Buses 100 and 101 couple signals $\hat{a}_n$ and $b_n$ and their delayed version at the output of each delay element 53 in parallel to processor 58. For the case of $\tau$ being equal to the baud interval, either the values or algebraic signs of $\hat{a}_n$ and $\hat{b}_n$ are required by processor 58. If, however, $\tau$ is some fraction of the baud interval, then decoder 48 must extrapolate either the values or algebraic signs of $\hat{a}_n$ and $\hat{b}_n$ each $\tau$ time interval from the values of $\hat{a}_n$ and $\hat{b}_n$ every baud interval. Such circuitry is also well-known in the art.

To substantially reduce the structure of the passband equalizer, each of the complexed valued coefficients represented by equation (1) or by equations (2) and (3) can be transformed into a single real-valued coefficient $\gamma_i$, where $-N \leq i \leq N$, in accordance with the following expression:

$$(\gamma_i)_K = 2Re[(\overline{C}_i)_K] \cos \omega_c i\tau - 2Im[(\overline{C}_i)_K] \sin \omega_c i\tau \quad (6)$$

where
$\omega_c$ = carrier signal frequency;

$\tau$ = delay provided by each delay line element in equalizer 42;
Re = real part of the succeeding bracketed term;
Im = imaginary part of the succeeding bracketed term; and
$(\overline{C}_i)_K$ is the complex conjugate of $(\overline{C}_i^*)_K$ Therefore, pursuant to equation (6) each real-valued coefficient is a function of I', Q', and either $e_n^I$ or $e_n^Q$ plus the center frequency of the carrier signal at the equalizer input and the delay provided by each delay line element for the least mean square algorithm or its variants. Or, equivalently, for the zero forcing function or its variants, each real-valued coefficient is a function of I, Q, and either $e_n^I$ or $e_n^Q$ plus the center frequency of the carrier signal at the equalizer input and the delay provided by each delay line element. While $\tau$ can be either a baud interval delay or some function thereof. In the case of the latter, it is preferable that $\tau \leq \pi/\omega_m$, where $\omega_m$ is the maximum frequency in the carrier signal spectrum appearing at the input of equalizer 42, so that the resulting fractionally-spaced equalizer provides distortion compensation over the entire frequency band of the input signal. It should be noted that for the case of an equalizer having only one coefficient and, hence, no delay element, $\tau$ is equal to zero. Therefore, the terms $2Im[\overline{C}_i]_K \sin \omega_c i\tau$ and $\cos \omega_c i\tau$ in equation (6) are respectively equal to zero and 1.

Control processor 58 can be a microprocessor which can be programmed to determine each coefficient in accordance with the disclosed equation or could be implemented by circuitry. In either case, the specific programming or circuitry required would be straightforward to derive for a person skilled in the art.

It should, of course, be understood that while the present invention has been described in terms of a specific embodiment numerous modifications will be apparent to those skilled in the art without departing from the spirit and scope of the present invention. For example, while a specific structure for equalizer 42 has been disclosed, the present invention is applicable to any structure which forms the product of an incoming signal and an associated coefficient at one or more selected times.

What is claimed is:

1. Apparatus for compensating for distortion in an incoming signal comprising quadrature-related carrier signals, said incoming signal having a value which varies with time, and said apparatus comprising
   means for equalizing said incoming signal by multiplying the value of said incoming signal existing at at least one prescribed time by only one real-valued coefficient associated with each prescribed time;
   means for demodulating the equalized incoming signal into a first pair of component signals; and
   means for generating each coefficient in response to at least one component signal in said first pair.

2. The apparatus of claim 1 wherein said component signals have respective amplitudes and said generating means comprises means for sampling the amplitude of each component signal at predetermined times.

3. The apparatus of claim 2 wherein said generating means further comprises decoding means for quantizing each sampled amplitude into one of a plurality of predetermined values.

4. The apparatus of claim 3 wherein said decoding means also forms error signals each being equal to the algebraic difference between each sampled amplitude and the associated quantized value.

5. The apparatus of claim 4 wherein said generating means comprises processing means for forming each coefficient in response to at least one of said error signals and said quantized sampled amplitudes of said first pair of component signals.

6. The apparatus of claim 5 wherein said quantized sampled amplitudes each have an algebraic sign and said processing means forms each coefficient in response to the algebraic signs of said quantized sampled amplitudes.

7. The apparatus of claim 6 wherein said error signals each have an algebraic sign and said processing means also forms each coefficient in response to the algebraic sign of at least one of said error signals.

8. The apparatus of claim 5 wherein said processing means forms each coefficient in response to the algebraic signs of said quantized sampled amplitudes.

9. The apparatus of claim 1 further comprising means for a demodulating said incoming signal into a second pair of component signals.

10. The apparatus of claim 9 wherein said generating means generates each coefficient also in response to said second pair of component signals.

11. The apparatus of claim 10 wherein said first and second pairs of component signals each have an amplitude and said generating means comprises means for sampling the amplitude of each component signal in said first and second pairs at predetermined times.

12. The apparatus of claim 11 wherein said generating means further comprises decoding means for quantizing the sampled amplitude of each component signal in said first pair into one of a plurality of predetermined values.

13. The apparatus of claim 12 wherein said decoding means also forms error signals each being equal to the algebraic difference between each sampled amplitude and the associated quantized value.

14. The apparatus of claim 13 wherein said generating means comprises processing means for forming each coefficient in response to at least one of said error signals and said second pair of component signals.

15. The apparatus of claim 14 wherein said error signals have associated algebraic signs and said processing means forms each coefficient in response to said second pair of component signals and the algebraic signs of at least one of said error signals.

16. The apparatus of claim 14 wherein said second pair of component signals and said error signals each have an algebraic sign and said generating means comprises processing means for forming each coefficient in response to the algebraic signs of said second pair of component signals and the algebraic signs of at least one of said error signals.

17. The apparatus of claim 10 wherein said quadrature-related carrier signals have a predetermined frequency and said generating means generates each coefficient as a function of said frequency.

18. The apparatus of claim 17 wherein said equalizing means comprise a delay line having at least one delay element and said generating means generates each coefficient as a function of the delay provided by said element.

19. The apparatus of claim 1 wherein said quadrature-related carrier signals have a predetermined frequency and said generating means generates each coefficient as a function of said frequency.

20. The apparatus of claim 19 wherein said equalizing means comprises a delay line having at least one delay element and said generating means generates each coefficient as a function of the delay provided by said element.

21. A method of compensating for distortion in an incoming signal comprising quadrature-related carrier signals, said method comprising the steps of
equalizing said incoming signal by multiplying said incoming signal at at least one prescribed time by only one real-valued coefficient associated with each prescribed time;
demodulating the equalized incoming signal into a first pair of component signals; and
generating each coefficient in response to at least one component signal in said first pair.

22. Apparatus for compensating for distortion in an incoming signal comprising quadrature-related carrier signals having a predetermined frequency, said apparatus comprising
means for equalizing said incoming signal by multiplying said incoming signal at prescribed times by a coefficient associated with each prescribed time; and
means for generating said coefficients in response to said equalized incoming signal and predetermined sinusoidal signals.

23. The apparatus of claim 22 wherein said sinusoidal signals vary with said frequency.

24. The apparatus of claim 22 wherein said equalizing means includes delay line elements and said sinusoidal signals vary with the delay provided with said elements.

* * * * *